United States Patent [19]

Plass

[11] Patent Number: 5,191,640
[45] Date of Patent: Mar. 2, 1993

[54] METHOD FOR OPTIMAL DISCRETE RENDERING OF IMAGES

[75] Inventor: Michael F. Plass, Mountain View, Calif.

[73] Assignee: Xerox Corporation, Stamford, Conn.

[21] Appl. No.: 633,930

[22] Filed: Dec. 26, 1990

[51] Int. Cl.⁵ .................... G06K 15/00; G09G 1/06
[52] U.S. Cl. .................................. 395/100; 395/112; 395/114; 340/728; 340/731; 358/448
[58] Field of Search ............... 395/100, 107, 116, 108, 395/117, 112, 114, 325, 500; 358/448, 80, 455, 456, 457; 340/728, 731, 744

[56] References Cited

U.S. PATENT DOCUMENTS

| | | |
|---|---|---|
| 4,495,522 | 1/1985 | Matsunawa et al. ............... 358/457 |
| 4,516,155 | 5/1985 | Hennig et al. ....................... 358/80 |
| 4,532,503 | 7/1985 | Pennebaker ........................ 340/728 |
| 4,602,285 | 7/1986 | Beaulier et al. .................... 340/728 |
| 4,610,026 | 9/1986 | Tabata et al. ....................... 340/728 |
| 4,622,595 | 11/1986 | Hisatake et al. .................... 358/457 |
| 4,725,892 | 2/1988 | Suzuki et al. ....................... 340/728 |
| 4,730,185 | 3/1988 | Springer et al. .................... 340/701 |
| 4,811,239 | 3/1989 | Tsao .................................... 358/75 |
| 4,974,171 | 11/1990 | Yeh et al. ............................. 395/112 |

Primary Examiner—Dale M. Shaw
Assistant Examiner—Kee M. Tung
Attorney, Agent, or Firm—Anglin & Giaccherini

[57] ABSTRACT

A technique for efficiently converting an original sampled image into a bitmap suitable for a specific output device. The method includes explicit printer and perception effects, and employs local permutations of bits, to find optimal bit settings. A continuous-tone image is first sampled to form a sampled image (12), through which a series of swaths are defined. For each swath (14i) in turn, an iterative procedure examines a column of bits (16) at a time, determining which configuration of the column of bits yields a minimal local difference value between the trial bitmap and the sampled image. While holding the rest of the trail bitmap constant, the column of bits is permuted and the difference value calculated, for each configuration of the column's look-ahead bits (22). To determine the difference values, local printer (17a) and perception (17b) models calculate effects between bits, while a local comparison model calculates the difference between the trial bitmap and the sampled image. The printable bitmap resulting from the methods of the present invention can be displayed by the output device to provide a faithful duplication of the original image.

4 Claims, 5 Drawing Sheets

METHOD FOR OPTIMAL DISCRETE RENDERING OF IMAGES

BACKGROUND OF THE INVENTION

The present invention is a method for rendering two-dimensional continuous-tone images on bi-level digital output devices. Increasingly sophisticated and powerful computer resources are able to manipulate a variety of generic data types. Text data and organized databases were the earliest of data types. Currently, graphics and image data are being created, transferred and manipulated in general purpose computer systems. These new forms of data pose new problems for the computer systems designer. To the user, displaying an image on any of a wide variety of devices must be as transparent as displaying ASCII text documents. Office video displays with differing gray level capacity, laser printers, and home dot-matrix printers, all of various resolutions and aspect ratios, must render a given image in a similar way. To achieve this transparency of display, each output device should have a dedicated pre-processor that transforms generic digital image data to a form tailored to the characteristics peculiar to that device.

The binary nature of a given output device, for example a laser printer or video display, creates particular problems in rendering continuous-tone images. Outside of photographic film and some thermal sensitive materials, there does not exist a practical method of producing true continuous-tone hard copy. Computer hard copy devices are almost exclusively binary in nature. An output device is binary if the lowest resolvable image portion (often called a pixel or bit) is either on or off, not some intermediate value in between. While the video displays associated with workstations and terminals are certainly capable of true continuous-tone representations, they are often implemented with frame buffers that provide high spatial resolution rather than full gray-scale capability.

Digital half-toning techniques, implemented in an output pre-processor system, comprise any algorithmic process which creates the illusion of continuous-tone image from careful arrangement of binary picture elements. Since most output devices are designed for display of binary dot-matrix text or graphics, digital half-toning provides the mechanism to display images on them as well.

An adequate digital half-toning technique must contend with two particular problems. Both problems stem from the interactions of local groups of displayed pixels in the final perception of the rendered image. First, peculiarities in the output device may allow neighboring pixel intensities to affect other pixels. For example, a printer may allow the bleeding of dye or toner from one localized pixel to another, altering the printed image. Second, the human eye itself tends to read groups of pixels together. This effect is often used to advantage to create the illusion of continuous-tone color in video displays. However, the effects of low-level processing by the human eye and brain can alter the perception of a theoretically accurate display of an image, leading to further undesired results.

A satisfactory method for rendering continuous-tone images onto any available binary display must take into account both display interactions and perceptual interactions in the processing of images. Such a method should allow a variety of different display system characteristics to be used interchangeably, without great difficulty, in order to process an image for a given display. In addition, the method should explicitly take into account the interactions of pixels on each other, both in the physical output of the display and in the perception by the human eye and brain. The method should also permit the processing of images for a given display system in a minimum amount of time, and without requiring inordinate amounts of computational power.

SUMMARY OF THE INVENTION

The present invention provides a novel and efficient algorithm for converting a two-dimensional continuous-tone image into a bitmap suitable for printing or display from a bi-level digital output device. The invention accounts for both the effects of the output device and the characteristics of eye-brain reception on local neighborhoods of pixels to provide an output image closely resembling the original image in a reasonable amount of time.

The inventive procedure begins with an original two-dimensional continuous-tone monochrome image. The original image is first decomposed into a lower resolution bitmap by laying a coordinate grid over the original image and assigning a grey-scale intensity value to each pixel of the grid, using standard sampling techniques. For convenience, the grid of pixels for the original image has the same spacing and dimensions as that corresponding to the output device's images, although the present method may be extended to instances where this is not the case. The present invention converts this original sampled image, being an array of multiple intensity values, into a printable bitmap, being an array of only on and off values. Throughout the description, printing is understood to include actual printing from dot matrix, laser or other printers and also the displaying of images on any video display, and any other display technology.

First, a printer model applicable to the particular output device is specified. The printer model is an algorithm for describing how the printer takes a particular printable bitmap and produces a given output. Often, various ink and paper interactions, such as non-linear or non-digital response of the imaging medium, dot spread or distortion, dot overlap, etc., prevent a rigorous one-to-one correspondence between the binary bitmap input and the printed bitmap output, or rendering. The printer model captures the essential aspects of the peculiarities in the device's output, and may be specified by printing and testing various binary test patterns. The printer model is a local model in the sense that the value of the printer model at a given point depends only upon a small number of nearby pixels in the bitmap. The simple printer model used in the current description takes into account the intensities of the 8 nearest neighbors of a given pixel in calculating the central pixel's output intensity.

Second, a perception model for describing how the eye and brain perceive a bi-level output image is provided. The eye and brain, in receiving a printed bitmap, tend to read each pixel as some combination of nearby pixels. The perception model captures in a very approximate way the effects produced by this low-level processing by the eye and brain. A simple model used in the current description computes the perceived intensity of each output pixel as a weighted average of the printed pixel intensities in the nine-by-nine neighborhood centered around that pixel, similar to the operation of the printer model. The application of the perception model onto the rendered output of the printer model provides a perceived bitmap image, or perception.

Third, a comparison model provides a method of comparing the perception of the original image with the perception of the printed image. The comparison is local in a similar way as the printer and perception models are local: it should be expressible as the sum of quantities, one quantity per pixel, with each quantity depending only on the values of the two images in some small neighborhood of a particular pixel. For the present description, a relatively simple comparison model subtracts the intensity value of the pixel of the perceived printed image from that of the corresponding pixel of the perceived original image and adds the absolute difference values for each pixel to arrive at an overall difference value for the two images.

The printer model describes how a given bitmap image emerges from a given output device: neighboring pixels may affect the physical intensity of a given pixel, so that the entire printed bitmap has been altered neighborhood-by-neighborhood. The perception model characterizes how each pixel of the printed bitmap is seen by the eye and brain, given each pixel's immediate neighborhood. And the comparison model describes how an individual might compare the perception of the printed image with the perception of the original. The three models, the printer, perception and comparison models, both describe how a bitmap image is printed, perceived and compared with the original image, and provide procedural tools for altering the bitmap before printing to more closely match the original image.

The present invention uses these models to analyze alternative bitmaps of the original image, before any bitmap has been sent to an actual printer or other output device, to more faithfully reproduce the original image. Simply comparing every permutation of the printable bitmap with the original sampled image would be a needlessly complex task. Instead, the present invention provides a dynamic programming algorithm for simplifying this task and yielding extremely close bitmap renderings of original images in an acceptable length of time.

To simplify the problem of permuting a sampled image to form an acceptable printable bitmap, a series of parallel swaths through the image are used to perform only local permutations, one swath at a time. A swath signifies here a linear path of adjacent bits or pixels in the bitmap, having a constant width of n bits. Each column of n bits in a swath is numbered starting with one and ending with the length of the swath in pixels. Depending on the particular printer and perception models chosen, a certain number of columns of non-image bits will be added at the beginning and the end of the swath as a border and are typically preset to a single value. For convenience, these non-image bits are preset and held at 0. To analyze and choose the proper settings for the bits within the current swath, all the bits of the image outside the swath are held constant. Then, the next swath in turn is analyzed and altered, and so on until the entire image has been processed.

As a first step in the processing of an individual swath, the first column of n bits is chosen as the current column to analyze. A number k of consecutive columns of "look-ahead" bits after the first column are also selected. An array of all possible configurations of the look-ahead bits will be attached in computer memory to the index for the current column of bits. In addition, a first and second neighborhood of pixels are defined around the current column of bits. The size of these neighborhoods is provided by the printer and perception models. The perception model defines the boundaries of the second neighborhood, being here a three-by-three square of bits around each bit in the current column. The first neighborhood is larger and accounts for printer effects at each pixel in the second smaller neighborhood. Here, for example, each pixel in the second neighborhood is affected by pixels in a three-by-three neighborhood centered around it. Hence, the first printer model neighborhood will comprise the area of the second perception model neighborhood plus a one pixel border around the second neighborhood's perimeter. Some portion of the bits of these two neighborhoods will comprise the look-ahead bits, a large number will include those bits of the image held constant outside the current swath, and, especially for the first few and last few columns, a certain number of bits may be non-image bits outside the actual sampled image which may be assigned the intensity value of zero.

For each possible configuration of the look-ahead bits, values for the current column of bits are selected which minimize the local difference between the printed image and the original image. Several sub-steps accomplish this selection. Keeping the particular configuration of the look-ahead bits constant, the current column of bits is permuted one configuration at a time. For each configuration of the current column, the printer model is applied to the first neighborhood around the first column, providing a close approximation to how the printer device would render the current configuration of the bitmap for those pixels within the second neighborhood. Applying the perception model to the pixels in the second neighborhood (rendered by the printer model) yields a close approximation to how the eye and brain would perceive the printed pixels in the column itself. Finally, the comparison model calculates the overall difference between the perceived values of the current column and the perceived values of the original image, recording that combined difference value with the particular configuration of the current column. After all configurations of the column bits have been made, the configuration which yields the least difference between printed image and original image is stored along with the particular configuration of look-ahead bits to which it belongs. The same process is repeated to find the optimal current column of bits for each possible combination of its look-ahead bit set, keeping the rest of the bitmap constant.

The next step in the process assigns the succeeding column of bits in the swath to be the current column, and adjusts the columns of look-ahead bits accordingly. Again, for every configuration of look-ahead bits, the values of bits for the new current column are permuted to find the optimal set of bits which minimize the combined difference value between the printed image and the original image. One change is made, however, in that the combined difference value calculated at each column is cumulative, taking into account the difference values determined for the previous columns of bits. This summing of difference values may be done because successive analysis steps for each current column are linked. A particular combination of permuted values of the current column combined with its permuted set of look-ahead bits yields a single configuration of look-ahead bits for the previous "current" column, the one we just examined. Given this configuration of look-ahead bits, one has already calculated which combination of the previous column's bits to choose to minimize the cumulative combined difference value. Working backwards, all the optimal choices for previous columns may be looked up once we select a configuration for the current column. Since these values are set, as are the bits outside the swath, one can again calculate the combined difference value for all columns up to and including the current column, for each configuration of the current column's values, given each configuration of that column's set of look-ahead bits.

The process of choosing optimal values for a current column for each configuration of its look-ahead columns, to minimize the cumulative combined difference value, is repeated for each column of bits in turn, until the last column of image bits is reached. Since the look-ahead bits for the last column are set at one value (in other words, they are non-image bits which have only one configuration), calculating the optimal values for the last column given its look-ahead bits yields only one set of optimal bit values. These values are the "best" values to choose for this last column, given the behavior of the printer and reception by the eye and brain. The procedure then cascades backwards, since the last column of values combined with the next $k-1$ look-ahead values (all zeros) determines the look-ahead values for the next-to-last column. One needs to only look up which set of values for the next-to-last column minimize the combined difference value, given the established set of look-ahead values, and another column of values has been determined. Now the bits of the next-to-last and last columns and the next $k-2$ look-ahead columns provide the configuration for the look-ahead bits of the next column working backwards. Again, given this selection of look-ahead bits, the optimal values for the column may be looked up from the previous calculations. The procedure continues backwards until the first column is reached and all bits for all columns in the swath have been chosen. At this point, the combined difference value between the perceived printed image and the perceived original image has been minimized for the current swath.

The procedure described for the first swath is repeated for all swaths in the image. Giving a time of calculation vs. quality of image trade-off, the overall process may be conducted several times across the sampled image, until the printable bitmap relaxes into a bitmap providing a very close rendition of the original image. For instance, after the first swaths are laid out in a vertical path and analyzed from left to right, another set of swaths laid out horizontally and analyzed from top to bottom may be processed, and so on. The marginal benefits gained from each pass of the processing algorithm would typically decrease as the number of passes increases. The printable bitmap resulting from the present invention, once processed by the output device, should provide a faithful duplication of the original image. The present invention, by including explicit printer and perception effects, and by employing a local configuration of bits to find local optimal choices given future selections of the look-ahead bits, provides a technique for efficiently and successfully converting an original sampled bitmap into a bitmap suitable for a specific output device.

An appreciation of other aims and objectives of the present invention and a more complete and comprehensive understanding of this invention may be achieved by studying the following description of a preferred embodiment and by referring to the accompanying drawings.

DETAILED DESCRIPTION OF A PREFERRED EMBODIMENT

To illustrate the present invention, it is helpful to first examine a related one-dimensional problem. In this related problem, a hypothetical one-dimensional continuous-tone image is converted to a binary one-dimensional bitmap. To accomplish the conversion process, the printer, perception and comparison models must be specified.

For the sake of illustration, a simple printer model may be used. The model is shown in Table 1 below. The model represents the combined non-linear and non-digital effects of an actual output device, due to imaging medium, dot spread or distortion, dot overlap, etc. To use the printer model, a computation means samples three contiguous bitmap bits (for example, "1-1-0") and uses the printer look-up table given in Table 1 to calculate the actual intensity of center bit as displayed. The contiguous bitmap trio 1-1-0, according to Table 1, would result in the output of 0.8 for the center bit (what should theoretically have been a "1" in intensity). The printer model used in Table 1 is relatively simple, being a (0.2,0.6,0.2) convolution kernel applied to each successive bitmap trio. By applying the printer model to each bit of the bitmap, i.e., convolving it with its neighboring bits, the resultant printed bitmap (the rendering) can be calculated. The more accurate the printer model in duplicating non-linear printer effects, the more accurate this calculation will be.

TABLE 1

| Printer Model | | | |
|---|---|---|---|
| Adjacent Bitmap Bits | | | Printed Center Bit |
| $i-1$ | $i$ | $i+1$ | $i$ |
| 0 | 0 | 0 | 0.0 |
| 0 | 0 | 1 | 0.2 |
| 1 | 0 | 0 | 0.2 |
| 1 | 0 | 1 | 0.4 |
| 0 | 1 | 0 | 0.6 |
| 0 | 1 | 1 | 0.8 |
| 1 | 1 | 0 | 0.8 |
| 1 | 1 | 1 | 1.0 |

Once the printer model has been applied to the initial bitmap, yielding the bitmap rendering, the perception model can be applied. The perception model, as discussed above, provides an approximate version of the low-level processing of the human eye and brain. For the present example, a simple perception model uses the following computation. For each rendered pixel location, the pixel's value multiplied by 2 is summed with the values of the two adjacent pixels. In essence, this calculation constitutes a low-pass filter with a (1,2,1) convolution kernel. After the perception model has been applied to the rendered bitmap, the new perception of the bitmap can be compared with an original paradigm image, using a comparison model, to determine how far from ideal the perceived image is. The comparison model used in the present description simply sums the absolute values of the pixel-by-pixel differences in the intensities of the two images.

The following Table 2 illustrates the operation of the three models on a trial bitmap. The trial bitmap is compared with a desired paradigm image, shown in the second column. To account for the edges of the image (whether a one-dimensional image as in the present example, or the more usual two-dimensional image), calculations involving the borders of the bitmap may simply supply a 0 value for any non-existent non-image pixels beyond the bitmap boundary. Referring to the first row of Table 2, the neighbors of the first bit of the trial bitmap (value=0) are 0 and 1. The 0 neighbor has been arbitrarily supplied, since the bitmap ends at bit number 1. Application of the printer model to the first bit and its neighbors yields a rendered bit having a value of 0.2. The perception model is next applied to the neighborhood around the rendered bit number one (the values are: 0.0 (supplied since the non-image bit is outside the bitmap boundary), 0.2, and 0.6). The perception model yields a perceived value of 1.0 at bit number 1. Finally, the comparison model takes the absolute value of the difference between the perceived value of the trial bitmap bit (1.0) and the perceived value of the original image (0.9) to yield a "badness" value for that bit of 0.1. The 0.9 value for the perceived value of the original image bit is found by applying the same perception model to the image values found in column two. (For example, the calculation would be $1*(0.0)+2*(0.3)+1*(0.3)=0.9$). "Badness" indicates the difference in perceived value of the printed trial bitmap pixel and the sampled image pixel. Summing all the badness values for all the trial bitmap bits yields an overall badness value of 5.2.

chosen in the present example, the partial badness calculated over the first three bit locations does not depend at all upon the bitmap values for locations 6 through 9. The perceived value of last bit 3 depends upon the rendered value of bit 4 through operation of the perception model, while the rendered value of bit 4 depends upon the trial bit 5, through operation of the printer model. In this way, the perceived value of bit 3 is linked to the trial bitmap value of bit 5, but to no further bits. The localness of each model effectively cuts off, after a certain point, the dependency of the perceived value of a given bit from the rest of the bit values.

The problem of finding the optimal one-dimensional trial bitmap can be expressed as a set of related subproblems, each of the form:

Subproblem i: Construct a table which calculates, for every possible setting of bits $i+1$, $i+2$, $i+3$, $i+4$, the minimum partial badness for cells 1 through $i+2$, along with the setting for bit i which attains this minimum.

In this formalism, i represents the bit currently being considered and $i+1$, $i+2$, $i+3$, $i+4$ are "look-ahead bits". Since there are $2^4=16$ possible combinations of the look-ahead bits, and 2 possible states for bit i, the table would have 32 combinations. Half of these combinations would be eliminated as not minimizing the partial badness for a particular look-ahead configuration.

The first subproblem 1 is easily solved by examining all 32 cases and retaining the 16 yielding a lower partial badness value. A portion of the table is shown below in Table 3:

TABLE 3

| Configuration Table for Subproblem 1. | | | | | |
|---|---|---|---|---|---|
| Bit Number | | | | Value for | Badness for Cells 1 |
| 2 | 3 | 4 | 5 | Bit # 1 | to 3 |
| 0 | 0 | 0 | 0 | ... | ... |
| ... | | | | | |
| 1 | 0 | 0 | 0 | 0 | 0.8 |
| 1 | 0 | 0 | 0 | 1 | 3.0 |
| ... | | | | | |

For each configuration of look-ahead bits 2 through 5, two possible values for bit 1 exist, 0 and 1. For the particular look-ahead bit configuration 1-0-0-0, letting bit 1 equal 0 yields a partial badness of 0.8, while a value of 1 yields a partial badness of 3.0. Hence, value 0 is

TABLE 2

| | | | Application of Models to Trial One-Dimensional Bitmap. | | | | | | | | |
|---|---|---|---|---|---|---|---|---|---|---|---|
| Bit | Image Value | Trial Bitmap Value | Bit Neighborhood | | | After Printer Model | Bit Neighborhood | | | After Perception Model | After Comparison Model | = Badness |
| 1 | 0.3 | 0 | 0 | 0 | 1 | 0.2 | 0.0 | 0.2 | 0.6 | 1.0 | \|1.0-1.9\| | 0.1 |
| 2 | 0.3 | 1 | 0 | 1 | 0 | 0.6 | 0.2 | 0.6 | 0.2 | 1.6 | \|1.6-1.3\| | 0.3 |
| 3 | 0.4 | 0 | 1 | 0 | 0 | 0.2 | 0.6 | 0.2 | 0.0 | 1.0 | \|1.0-1.4\| | 0.4 |
| 4 | 0.3 | 0 | 0 | 0 | 0 | 0.0 | 0.2 | 0.0 | 0.2 | 0.4 | \|0.4-1.4\| | 1.0 |
| 5 | 0.4 | 0 | 0 | 0 | 1 | 0.2 | 0.0 | 0.2 | 0.8 | 1.2 | \|1.2-1.6\| | 0.4 |
| 6 | 0.5 | 1 | 0 | 1 | 1 | 0.8 | 0.2 | 0.8 | 1.0 | 2.8 | \|2.8-2.0\| | 0.8 |
| 7 | 0.6 | 1 | 1 | 1 | 1 | 1.0 | 0.8 | 1.0 | 0.8 | 3.6 | \|3.6-2.3\| | 1.3 |
| 8 | 0.6 | 1 | 1 | 1 | 0 | 0.8 | 1.0 | 0.8 | 0.2 | 2.8 | \|2.8-2.3\| | 0.5 |
| 9 | 0.5 | 0 | 1 | 0 | 0 | 0.2 | 0.8 | 0.2 | 0.0 | 1.2 | \|1.2-1.6\| | 0.4 |

Since the overall badness value of a particular trial bitmap may be calculated, the methods of the present invention enable the determination of the trial bitmap which minimizes this badness value. The method relies on the locality of the individual models, i.e. that a calculation for a given pixel or bit only depends on some local neighborhood of pixels. For the particular models retained as the optimal value for bit 1 given the particular configuration of look-ahead bits.

Successive subproblems are slightly different. Subproblem 2 tabulates the ways to minimize the partial badness of cells 1 through 4 for each setting of bits 3, 4, 5 and 6, to find the optimal values for bit number 2.

Table 4 illustrates a partially filled-in table of these calculations.

Configuration Table for Subproblem 2.

| Bit Number | | | | Value for Bit # 2 | Badness for Cells 1 to 4 |
|---|---|---|---|---|---|
| 3 | 4 | 5 | 6 | | |
| 0 | 0 | 0 | 0 | ... | ... |
| ... | | | | | |
| 1 | 0 | 0 | 0 | ? | ? |
| ... | | | | | |

For each configuration of the look-ahead bits 3 through 6, alternate values of bit 2 are attempted. Once a particular value for bit 2 is selected, bits 2 through 5 provide a complete set of look-ahead bits for bit 1, as used in the preceding sub-problem 1. Thus, the results of the preceding calculations can be consulted to recall the optimal value of bit 1 given the particular values of its look-ahead bits, thereby setting the values for bits 1 through 6. Using these values and the printer and perception models, the overall badness for bits 1 through 4 can be calculated for both values of bit 2, allowing an optimal value of bit 2 to be selected.

The solution of the remaining sub-problems proceeds in the same way, selecting alternative values for the current bit for a particular configuration of look-ahead bits. In each successive sub-problem, the value of the current bit, combined with a subset of its look-ahead bits, provides a configuration of look-ahead bits for the preceding sub-problem. Hence, the table constructed from the preceding sub-problem can be consulted, the configuration of look-ahead bits used as an index, and the optimal value of the current-minus-1 bit determined. Then, the value of the current-minus-1 bit, the current bit and a portion of the current bit's look-ahead bits provide a configuration of look-ahead bits for the current-minus-2 subproblem, and so on. In this fashion, alternately selecting the value of an ith bit, and a particular configuration of the ith bit's look-ahead bits, completely determines the values of bits 1 through i+4. From these values and the printer and perception models, the minimum badness for bits 1 through i+2 can be determined. Finally, solving for the optimal value of the final bit in the last sub-problem determines the minimum badness for the whole bitmap. The final sub-problem constructs a table with only one row, since all the look-ahead bits fall outside the image and are all set to zero (in other words, there is only one possible configuration of look-ahead bits).

Having completed the last sub-problem, the optimal settings for all the bits of the bitmap may be easily determined by tracing backwards through the solutions to the subproblems. The last table yields the setting for the last bit, the last bit and the next-to-last table yield the optimal setting for the next-to-last bit, and so on, ending finally with the first table and all previously determined bits, which combined yield the optimal value for bit 1.

The method of solution demonstrated for the one-dimensional image case may be adapted to find near-optimal solutions for the two-dimensional case. Because of the extra dimension, the table-building scheme described above can no longer be used to find an exact solution. However, the techniques provide an efficient and practical method for calculating near-optimal two-dimensional solutions.

Figure 1:
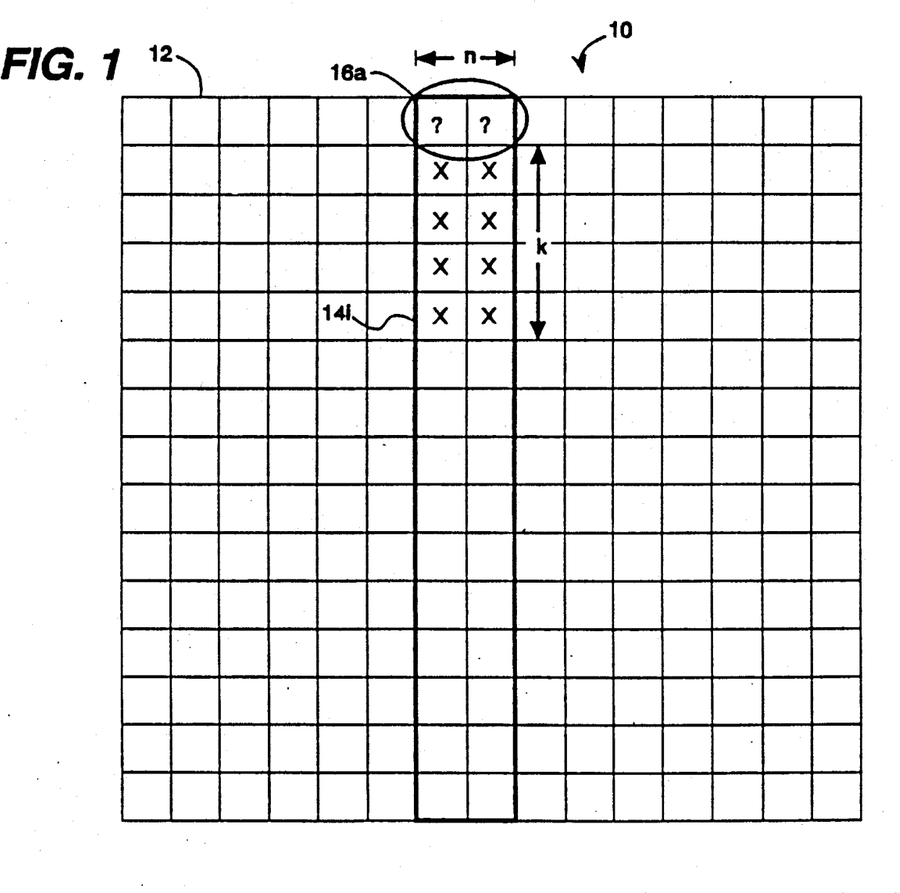
FIG. 1 is a schematic depiction of a bitmap, with a swath, current bit column and look-ahead bits displayed in accordance with the present invention.

The present invention adapts the one-dimensional method to optimize a given image over one narrow swath of pixels at a time. This simplifies the problem of permuting a sampled image to form an acceptable printable bitmap. A swath 14 signifies here a linear path of adjacent bits or pixels in the bitmap 12, having a constant width of n bits. In the present example, n is equal to 2, as shown in FIG. 1. Each column of n bits in a swath is numbered starting with one and ending with the length of the swath in bits. As discussed above, depending on the particular printer and perception models chosen, a certain number of columns of non-image bits will be added at the each end of the swath as a border and are typically preset to a single value. For the particular models used in the present discussion (having three-by-three neighborhoods around each pixel) two columns of non-image bits are required at the beginning of the swath; four columns are needed at the end. For convenience, these non-image bits are preset and held at 0. To analyze and choose the proper settings for the bits within the current swath, all the bits of the image outside the swath are held constant. Then, the next swath in turn is analyzed and altered, and so on, until the entire image has been processed.

Figure 2A:
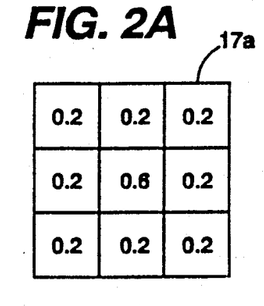
FIG. 2A is a representation of a two-dimensional printer model.
Figure 2B:
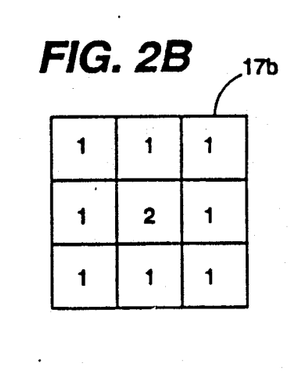
FIG. 2B is a representation of a two-dimensional perception model.

In adapting the printer and perception models discussed above to the two-dimensional case, they can simply become two-dimensional square convolutions around a particular bit or pixel. For instance, the printer model 17a can convolve the three-by-three neighborhood around a pixel using the same kernel as before (i.e. the center pixel value is multiplied by 0.6 and added to its eight nearest neighbor's values each multiplied by 0.2, as shown in FIG. 2A). In the same way, the perception model 17b convolves the three-by-three neighborhood around a pixel using the (1,2,1) kernel, as shown in FIG. 2B. The comparison model can remain the same, merely adding the absolute difference between the perceived values for individual printed bits and the perception of an ideal image.

Figure 3:
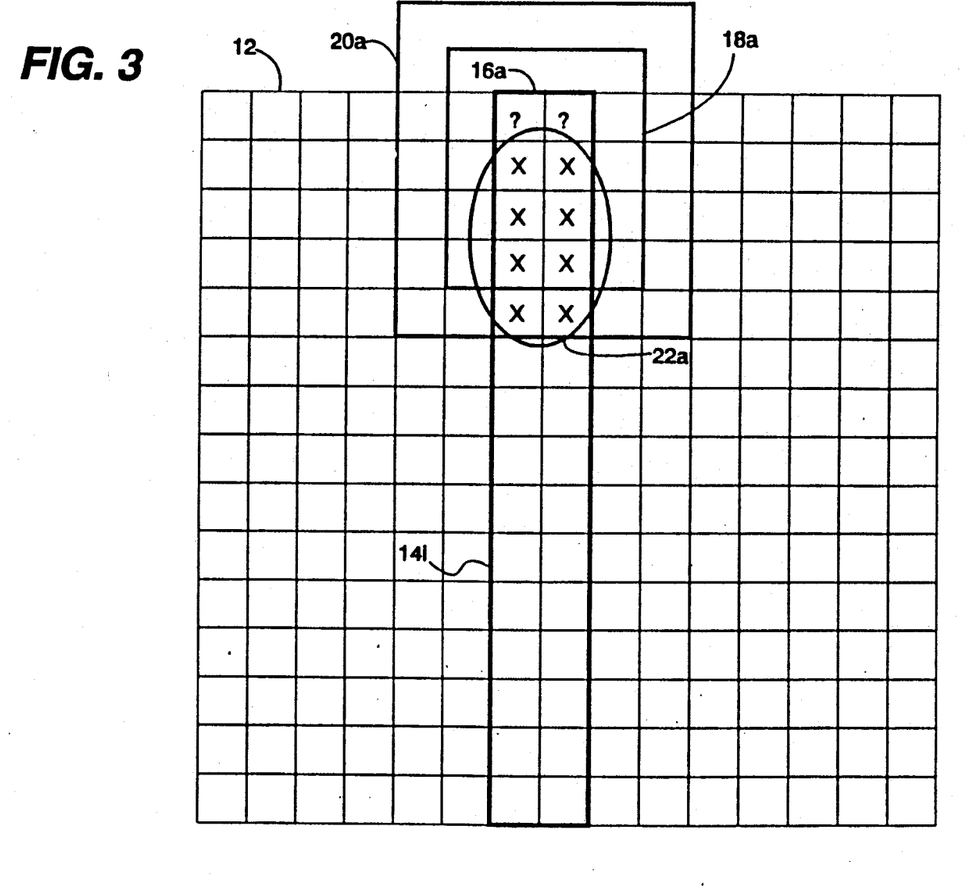
FIG. 3 is a schematic depiction of a bitmap, showing a first and second neighborhood superimposed upon the bitmap.

As a first step in the processing of an individual ith swath 14i of a sampled image 12, the first column 16a of n bits is chosen as the current column to analyze. A number k of consecutive columns of "look-ahead" bits after the first column are also selected. In the present example, k is equal to 4. An array of all possible configurations of the look-ahead bits will be attached in computer memory to the index for the current column of bits. In addition, a first and second neighborhood of pixels are defined around the current column of bits. The size of these neighborhoods is provided by the printer and perception models 17a and 17b. The perception model defines the boundaries of the second neighborhood 18a, shown in FIG. 3, being here a three-by-three square of bits around each bit in the current column and a certain number of the look-ahead columns of bits. In the present case, two further columns beyond the current column are included in the second neighborhood. Those bits within the second neighborhood and within the swath will be used in the comparison step to determine the minimum badness of the printed and perceived image.

Figure 4:
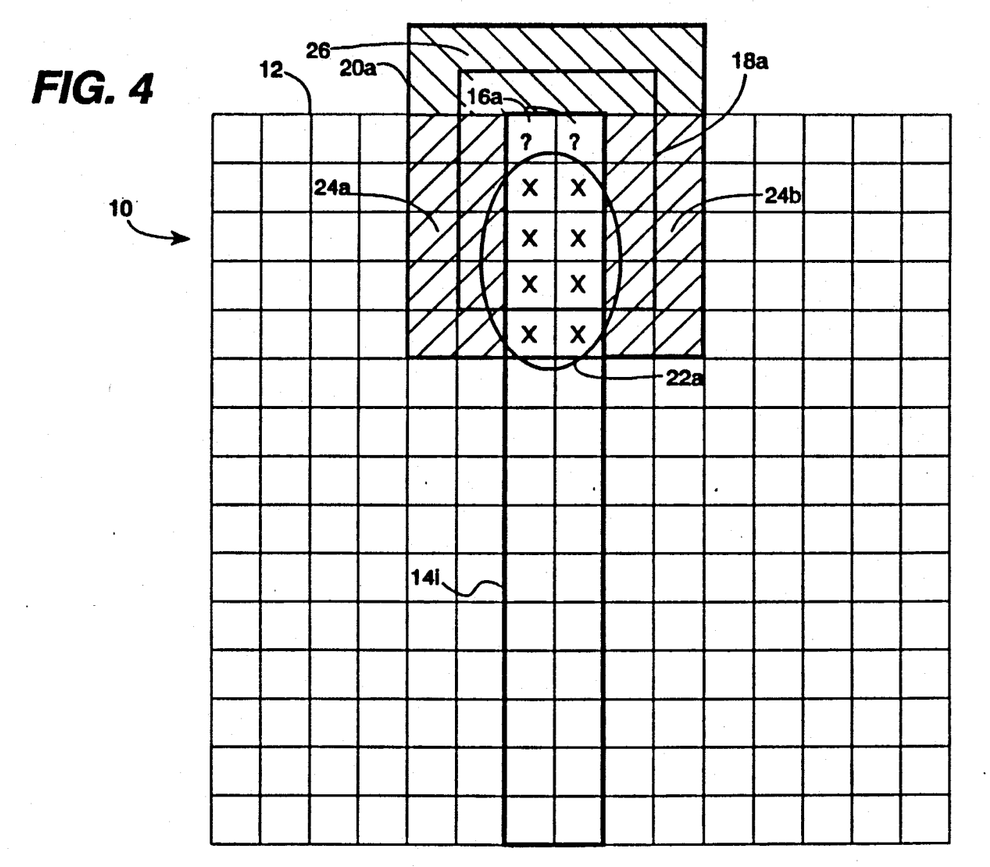
FIG. 4 is a schematic depiction of a bitmap, revealing non-swath bit areas and non-image bit areas.

The first neighborhood 20a is larger and accounts for printer effects at each pixel in the second smaller neighborhood. Here, for example, each pixel in the second neighborhood is affected by pixels in a three-by-three neighborhood centered around it. Hence, the first printer model neighborhood 20a will comprise the area of the second perception model neighborhood 18a plus a one pixel border around the second neighborhood's perimeter. Some portion of the bits of these two neighborhoods will comprise the look-ahead bits (area 22a, shown in FIG. 4), a large number will include those bits of the image held constant outside the current swath (areas 24a and 24b), and, especially for the first few and last few columns, a certain number of bits may be non-image bits outside the actual sampled image which may be assigned the intensity value of zero (area 26).

Figure 5:
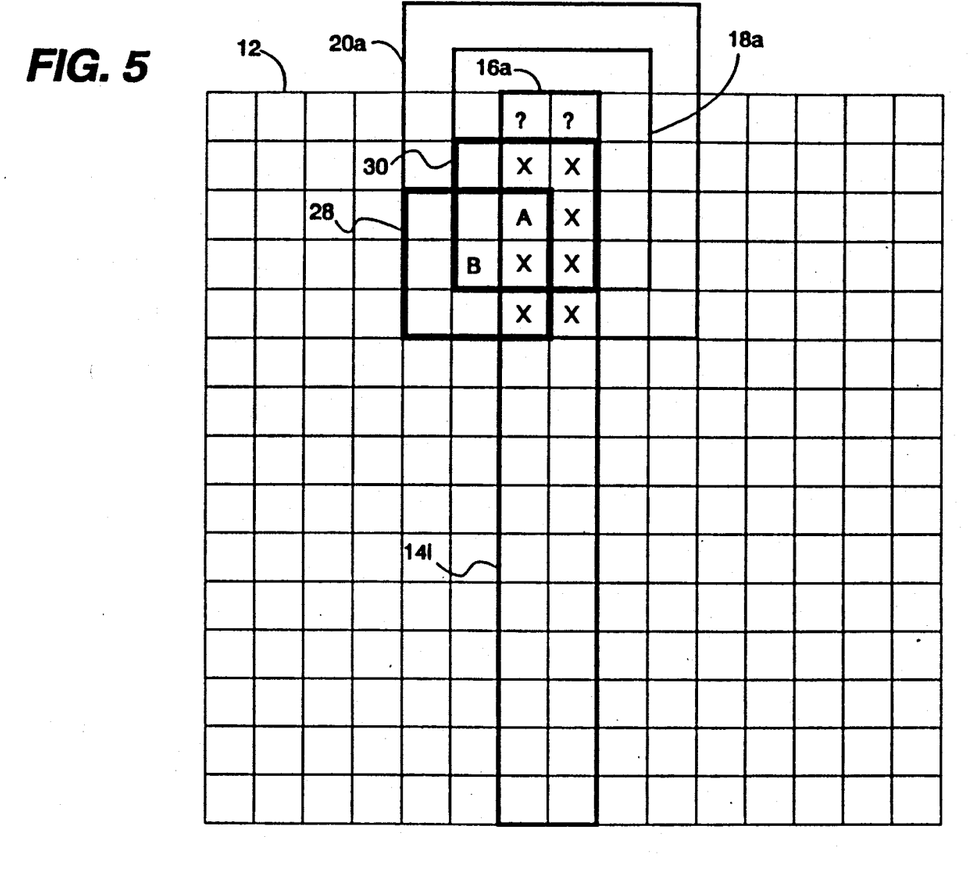
FIG. 5 is a schematic depiction of a bitmap, representing operation of the printer and perception models.

FIG. 5 illustrates the two-dimensional operation of the printer and perception models. To find the rendered value of bit B, the printer model 17a convolution values shown in FIG. 2A are applied to the three-by-three neighborhood 28 around B, neighborhood 28 lying within the first neighborhood 20. Then, to find the perceived value of A, the perception model 17b convolution values shown in FIG. 2B are applied to the rendered values of the three-by-three neighborhood 30 around pixel A. All pixels B in neighborhood 30 would have similar neighborhoods 28 around them to apply the printer model to, and all pixels A within the swath of interest would have similar neighborhoods 30 around them. The set of all neighborhoods 30 for all pixels A in a given set of columns in the current swath constitute the second neighborhood 18a; the set of all neighborhoods 28 around all values B in the second neighborhood 18a constitute the first neighborhood 20a.

For each possible configuration of the look-ahead bits 22a, values for the current column 16a of bits are selected which minimize the local difference between the printed image and the original image. Several sub-steps accomplish this selection. First, keeping the particular configuration of the k columns of look-ahead bits constant, the current column of bits 16a is permuted one configuration at a time. Next, for each configuration of the current column 16a, the printer model 17a is applied to the first neighborhood 20a around the first column 16a, providing a close approximation to how the printer device would render the current configuration of the bitmap for those pixels within the second neighborhood 18a. Then, applying the perception model 17b to the pixels in the second neighborhood 18a (rendered by the printer model) yields a close approximation to how the eye and brain would perceive the printed pixels in the column itself. Finally, the comparison model calculates the overall difference between the perceived values of the current column (and a given number of look-ahead columns within the second neighborhood 18a, here chosen to be two) and the perceived values of the original image, recording that combined difference value with the particular configuration of the current column 16a. After all configurations of the column bits 16a have been made, the configuration which yields the least difference between printed image and original image is stored along with the particular configuration of look-ahead bits to which it belongs. The same process is repeated to find the optimal current column of bits 16a for each possible combination of its look-ahead bit set 22a, keeping the rest of the bitmap 12 constant.

Figure 6:
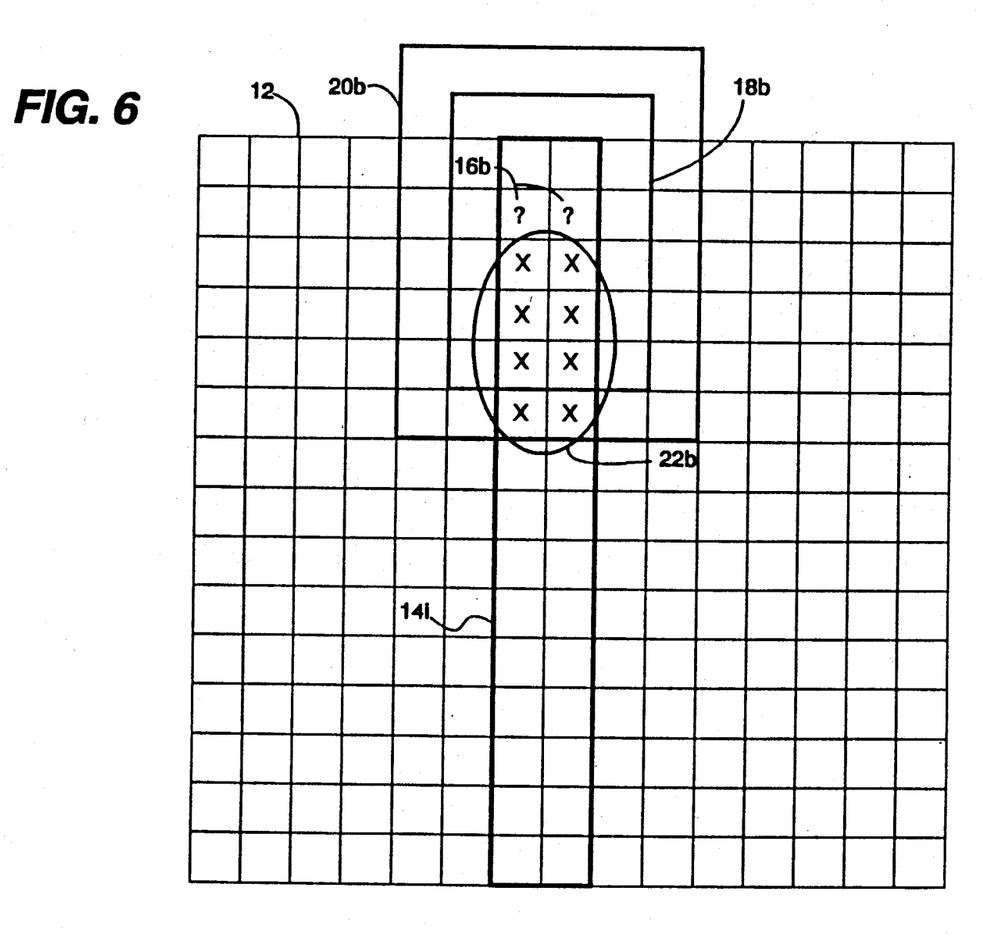
FIG. 6 is a schematic depiction of a bitmap, with a current bit column advanced one bit ahead, in accordance with the present invention.

The next step in the process assigns the succeeding column of bits 16b in swath 14i to be the current column, and adjusts the k columns 22b of look-ahead bits accordingly, as shown in FIG. 6. Again, for every configuration of look-ahead bits 22b, the values of bits for the new current column 16b are permuted to find the optimal set of bits which minimize the combined difference value between the printed image and the original image. First neighborhood 20b and second neighborhood 18b are also adjusted accordingly. One change is made, however, in that the combined difference value calculated at each column 16b is cumulative, taking into account the difference values determined for the previous columns of bits (16a, etc.). This summing of difference values may be done because successive analysis steps for each current column are linked. A particular combination of permuted values of the current column 16b combined with its permuted set of look-ahead bits 22b yields a single configuration of look-ahead bits 22a for the previous "current" column 16a, the one just examined. Knowing this configuration of look-ahead bits, the combination of the previous column's bits 16a has already been calculated to know which to choose to minimize the cumulative combined difference value. Working backwards, all the optimal choices for previous columns may be looked up once a configuration for the current column is selected. Since these values are set, as are the bits outside the swath, the combined difference value for all columns up to and including the current column can be calculated, for each configuration of the current column's values, given each configuration of that column's set of look-ahead bits.

The process of choosing optimal values for a current column for each configuration of its look-ahead columns, to minimize the cumulative combined difference value, is repeated for each column of bits in turn, until the last column of image bits is reached. Since the look-ahead bits for the last column are set at one value (in other words, they have only one configuration, being all non-image bits set at zero), calculating the optimal values for the last column given its look-ahead bits yields only one set of optimal bit values. These values are the "best" values to choose for this last column, given the behavior of the printer and reception by the eye and brain. The procedure then cascades backwards, since the last column of values combined with the next k−1 look-ahead values (all zeros) determines the look-ahead values for the next-to-last column. As described above, one can refer to the already calculated set of minimal values for the next-to-last column, given an established set of look-ahead values, to determine another column of bit values. Then, the bits of the next-to-last and last columns and the k−2 look-ahead columns provide the configuration for the look-ahead bits of the next column working backwards. Again, given the particular selection of look-ahead bits, the optimal values for the column may be looked up from the previous calculations. The procedure continues backwards until the first column is reached and all bits for all columns in the swath have been chosen. At this point, the combined difference value between the perceived printed image and the perceived original image has been minimized for the current swath.

The procedure described for the first swath is repeated for all swaths 14i in the image. Giving a time of calculation vs. quality of image trade-off, the overall process may be conducted several times across the sampled image, until the printable bitmap relaxes into a bitmap providing a very close rendition of the original image. For instance, after the first swaths are laid out in a vertical path and analyzed from left to right, another set of swaths laid out horizontally and analyzed from top to bottom may be processed, and so on. The marginal benefits gained from each pass of the processing algorithm would typically decrease as the number of passes increases. The printable bitmap resulting from the present invention, once processed by the output device, should provide a faithful duplication of the original image. The present invention, by including explicit printer and perception effects, and by employing a local configuration of bits to find local optimal choices given future selections of the look-ahead bits, provides a technique for efficiently and successfully converting an original sampled image into a bitmap suitable for a chosen output device.

The methods and apparatus for optimal discrete rendering of images disclosed are applicable to any image rendering application. In particular, although the present embodiment has been described with reference to continuous-tone monochrome images, the same inventive procedures may be readily applied to color image applications. Although the present invention has been described in detail with reference to a particular preferred embodiment, persons possessing ordinary skill in the art to which this invention pertains will appreciate that various modifications and enhancements may be made without departing from the spirit and scope of the claims that follow.

LIST OF REFERENCE NUMERALS

FIG. 1

10: Schematic Bitmap Diagram
12: Sampled image
14i: Current ith Bitmap Swath
16: Current Column FIGS. 2a and 2b 17a: Printer Model
17b: Perception Model

FIG. 3

18: Second Neighborhood
20: First Neighborhood
22: Look-Ahead Bits

FIG. 4

24: Non-Swath Image Bits Kept Constant
26: Non-Image Bits Held at Zero

FIG. 5

28: Printer Model Neighborhood
30: Perception Model Neighborhood

I claim:

1. A method for converting an original image to a printable bitmap comprising the steps of:

(a) defining a printer model (17a);
(b) defining a perception model (17b);
(c) defining a comparison model;
(d) sampling said original image to form a sampled image (12);
(e) constructing a plurality of parallel swaths (14) through said sampled image (12), each of said swaths (14) being a linear path of adjacent bits, each path having a width of n bits;
(f) defining a linear array of columns of bits (16a, 16b, etc.) for each of said swaths (14), each of said columns of bits (16) being n bits wide, each of said columns of bits (16) for each of said swaths (14) being numbered consecutively;
(g) choosing a configuration of values of a first column of bits (16a) of an ith swath (14i), said ith swath (14i) including a number p of said columns of bits (16) and q columns of non-image bits having preset bits (26);
(h) determinig a first set of look-ahead bits (22a) adjacent to said first column of bits (16a) and within said ith swath (14i), said first set of look-ahead bits (22a) including a set of k consecutive columns of bits of said ith swath (14i), said first set of look-ahead bits having a configuration of values;
(i) applying said printer model (17a) to a first neighborhood (20a) around said first column of bits (16a) to provide a printed image of said first neighborhood (20a);
(j) applying said perception model (17b) to a second neighborhood (18a) within said printed image of said first neighborhood (20a) around said first column of bits (16a) to provide a perceived image of said second neighborhood (18a);
(k) applying said comparison model to compare said perceived image of said second neighborhood (18a) with said sampled image (12) of said second neighborhood (18a) to arrive at a difference value for each bit of a subset of columns of bits of said ith swath (14i) lying within said second neighborhood (18);
(l) calculating a combined difference value from said difference values;
(m) storing said combined difference value along with said configuration of values of said first column of bits (16);
(n) altering said configuration of values of said first column of bits (16) of said ith swath (14i);
(o) repeating steps (i) through (n) $2^n$ times until all of said configurations of values of said first column of bits (16) of said ith swath (14i) have been used;
(p) determining which of said configurations of values of said first column of bits (16) provides a least combined difference value for said configuration of values of said first set of look-ahead bits (22), by comparing said stored combined difference values;
(q) altering said configuration of values of said first set of look-ahead bits (22) of said ith swath (14i);
(r) repeating steps (i) through (q) up to $2^{n+k}$ times until all of said configurations of values of said first set of look-ahead bits (22) of said ith swath (14i) have been used; and
(s) storing a configuration of values of said first column of bits (16) for each of said configuration of values of said first set of look-ahead bits (22), said stored configuration of values of said first column of bits (16) providing a least combined difference value for a respective configuration of values of said first set of look-ahead bits (22).

2. The method as recited in claim 1 further comprising the steps of:

(t) choosing a configuration of values of a jth column of bits (16b) of said ith swath (14i);
(u) determining a jth set of look-ahead bits (22b) adjacent to said jth column of bits (16b) and within said ith swath (14i), said jth set of look-ahead bits (22b) including a set of k consecutive columns of bits of said ith swath (14i), said jth set of look-ahead bits (22b) having a configuration of values;
(v) applying said printer model (17a) to a first neighborhood (20b) around said jth column of bits (16b) to provide a printed image of said first neighborhood (20b);
(w) applying said perception model (17b) to a second neighborhood (18b) within said printed image of said first neighborhood (20b) around said jth column of bits (16b) to provide a perceived image of said second neighborhood (18b);

(x) applying said comparison model to compare said perceived image of said second neighborhood (18b) with said sampled image (12) of said second neighborhood (18b) to arrive at a difference value for each bit of a subset of columns of bits of said ith swath (14i) lying within said second neighborhood (18b);

(y) calculating a combined difference value from said difference values;

(z) storing said combined difference value along with said configuration of values of said jth column of bits (16b);

(aa) altering said configuration of values of said jth column of bits (16b) of said ith swath (14i);

(ab) repeating steps (v) through (aa) $2^n$ times until all of said configurations of values of said jth column of bits (16b) of said ith swath (14i) have been used;

(ac) determining which of said configurations of values of said jth column of bits (16b) provides a least combined difference value for said values of said jth set of look-ahead bits (22b), by comparing said stored combined difference values;

(ad) altering said configuration of said jth set of look-ahead bits (22b) of said ith swath (14i);

(ae) repeating steps (v) through (ad) up to $2^{n+k}$ times until all of said configurations of values of said jth set of look-ahead bits (22b) of said ith swath (14i) have been used;

(af) storing a configuration of values of said jth column of bits (16b) for each of said configurations of values of said jth set of look-ahead bits (22b), said stored configuration of values of said jth column of bits (16b) providing a least combined difference value for a respective configuration of values of said jth set of look-ahead bits (22b);

(ag) letting j equal j+1;

(ah) repeating steps (t) through (ag) until j equals p+1;

(ai) assigning a stored configuration of values of a pth column of bits to said pth column of bits of said ith swath; and (aj) assigning one of said stored configurations of values for a (p−1)th column of bits of said ith swath to said (p−1)th column of bits, said assigned configuration of values minimizing a combined difference value for a configuration of values of a (p−1)th set of look-ahead bits of said (p−1)th column of bits, said configuration of values of said (p−1)th set of look-ahead bits determined by said assigned configuration of values of said pth column of bits and said preset values of q−1 columns of said columns of non-image bits.

3. The method as recited in claim 2 further comprising:

(ak) assigning one of said stored configurations of values of an rth column of bits of said ith swath to said rth column of bits, said assigned configuration of values minimizing a combined difference value for a configuration of values of an rth set of look-ahead bits of said rth column of bits, said configuration of values of said rth set of look-ahead bits determined by a set of previously assigned values of an (r+1)th through an (r+k)th column of bits;

(al) assigning r equal to r−1; and (am) repeating steps (ak) through (al) until r equals 0.

4. The method as recited in claim 3 further comprising:

(an) repeating steps (g) through (am) for a set of said swaths (14) of said sampled image (12).

* * * * *